(12) United States Patent
Nguyen et al.

(10) Patent No.: US 9,883,084 B2
(45) Date of Patent: Jan. 30, 2018

(54) THERMAL IMAGER

(75) Inventors: Evans H. Nguyen, Renton, WA (US); Roger D. Neitzell, Palmyra, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 936 days.

(21) Appl. No.: 14/004,686

(22) PCT Filed: Mar. 15, 2012

(86) PCT No.: PCT/US2012/029217
§ 371 (c)(1),
(2), (4) Date: Sep. 12, 2013

(87) PCT Pub. No.: WO2012/125819
PCT Pub. Date: Sep. 20, 2012

(65) Prior Publication Data
US 2014/0002668 A1    Jan. 2, 2014

Related U.S. Application Data

(60) Provisional application No. 61/452,778, filed on Mar. 15, 2011.

(51) Int. Cl.
*G01J 5/00* (2006.01)
*H04N 5/225* (2006.01)
(Continued)

(52) U.S. Cl.
CPC .......... *H04N 5/2252* (2013.01); *G01J 5/0205* (2013.01); *G01J 5/0265* (2013.01);
(Continued)

(58) Field of Classification Search
CPC .... H04N 5/2252; H04N 5/332; H04N 5/2253; H04N 5/2258; G01J 5/0205; G01J 5/0265; G01J 5/04
See application file for complete search history.

(56) References Cited

U.S. PATENT DOCUMENTS 3,017,513 A    1/1962   Messelt
3,147,682 A *  9/1964   Lind, Jr. .................. G03B 3/00
                                                    396/142
(Continued)

FOREIGN PATENT DOCUMENTS

CN        101111748     1/2008
EP        1956833       8/2008
(Continued)

OTHER PUBLICATIONS

"Support". 2017. In Dictionary.com. Retrieved Jan. 9, 2017, from http://www.dictionary.com/browse/support?s=t#.*
(Continued)

*Primary Examiner* — Lisa Caputo
*Assistant Examiner* — Janice M Soto
(74) *Attorney, Agent, or Firm* — Michael Best & Friedrich LLP

(57) ABSTRACT

A handheld thermal imager includes a housing defining a cavity. A lens barrel has a first end portion and a second end portion. The lens barrel is at least partially disposed within the cavity. A lens is coupled to the lens barrel first end portion. A resilient buffer member supports the lens barrel within the cavity. A thermal sensor is coupled to the lens barrel second end portion. A processing module receives signals from the thermal sensor. A display is coupled to the processing module for displaying a temperature characteristic of a scene.

17 Claims, 8 Drawing Sheets

(51) Int. Cl.
*G01J 5/02* (2006.01)
*G01J 5/04* (2006.01)
*H04N 5/33* (2006.01)

(52) U.S. Cl.
CPC .............. *G01J 5/04* (2013.01); *H04N 5/2253* (2013.01); *H04N 5/2258* (2013.01); *H04N 5/332* (2013.01)

(56) References Cited

U.S. PATENT DOCUMENTS

| | | | |
|---|---|---|---|
| 3,646,267 A | 2/1972 | Tompsett | |
| 4,238,728 A | 12/1980 | Wells, Jr. et al. | |
| 4,343,182 A | 8/1982 | Pompei | |
| 4,494,042 A | 1/1985 | Roche | |
| 4,529,912 A | 7/1985 | Northrup et al. | |
| 4,590,429 A | 5/1986 | Sell | |
| 4,617,519 A | 10/1986 | Rosenthal | |
| 4,687,344 A | 8/1987 | Lillquist | |
| 4,779,687 A | 10/1988 | Schreiber et al. | |
| 4,779,739 A | 10/1988 | Carl et al. | |
| 4,842,147 A | 6/1989 | Carl et al. | |
| 4,922,185 A | 5/1990 | Davidson et al. | |
| 4,943,752 A | 7/1990 | Todd et al. | |
| 4,999,614 A | 3/1991 | Ueda et al. | |
| 5,005,083 A | 4/1991 | Grage et al. | |
| 5,008,626 A | 4/1991 | Boyd, Sr. | |
| 5,045,937 A | 9/1991 | Myrick | |
| 5,140,416 A | 8/1992 | Tinkler | |
| 5,179,339 A | 1/1993 | Volk, Jr. | |
| 5,319,312 A | 6/1994 | Segilia | |
| 5,369,363 A | 11/1994 | Hey | |
| 5,434,510 A | 7/1995 | Halstead | |
| 5,453,683 A | 9/1995 | Pagano | |
| 5,763,885 A | 12/1995 | Murphy | |
| 5,512,748 A | 4/1996 | Hanson | |
| 5,528,147 A | 6/1996 | Konopka | |
| 5,534,695 A | 7/1996 | Miyoshi et al. | |
| 5,539,317 A | 7/1996 | Janning | |
| 5,637,871 A | 6/1997 | Piety et al. | |
| 5,666,029 A | 9/1997 | McDonald | |
| 5,677,532 A | 10/1997 | Duncan et al. | |
| 5,732,302 A | 3/1998 | Yokota | |
| 5,789,622 A | 8/1998 | Quon | |
| 5,936,245 A | 8/1999 | Goillot et al. | |
| 5,952,832 A | 9/1999 | Stevanovic et al. | |
| 5,994,701 A | 11/1999 | Tsuchimoto et al. | |
| 6,009,340 A | 12/1999 | Hsia | |
| 6,028,312 A | 2/2000 | Wadsworth et al. | |
| 6,033,130 A | 3/2000 | Muroi et al. | |
| 6,115,559 A | 9/2000 | Balling et al. | |
| 6,133,569 A | 10/2000 | Shoda | |
| 6,232,602 B1 | 5/2001 | Kerr | |
| 6,249,002 B1 | 6/2001 | Butler | |
| 6,255,650 B1 | 7/2001 | Warner et al. | |
| 6,292,311 B1 | 9/2001 | Bohn et al. | |
| 6,335,478 B1 | 1/2002 | Chou et al. | |
| 6,373,055 B1 | 4/2002 | Kerr | |
| 6,480,001 B2 | 11/2002 | Frederick | |
| 6,486,473 B2 | 11/2002 | Salapow et al. | |
| 6,534,988 B2 | 3/2003 | Flory, IV | |
| D472,911 S | 4/2003 | Bielefeld | |
| 6,559,447 B2 | 5/2003 | Wood | |
| 6,603,302 B2 | 8/2003 | Prineppi | |
| 6,606,115 B1 | 8/2003 | Alicandro et al. | |
| 6,630,674 B2 | 10/2003 | Knauth et al. | |
| 6,649,912 B2 | 11/2003 | Salapow et al. | |
| 6,682,381 B1 | 1/2004 | Michael | |
| 6,707,044 B2 | 3/2004 | Lannestedt et al. | |
| 6,722,184 B2 | 4/2004 | Bennett et al. | |
| 6,730,909 B2 | 5/2004 | Butler | |
| 6,734,678 B2 | 5/2004 | Frederick | |
| 6,777,942 B2 | 8/2004 | Schadhauser | |
| 6,784,667 B2 | 8/2004 | Belenger et al. | |
| 6,787,775 B1 | 9/2004 | Bielefeld et al. | |
| 6,795,209 B1 | 9/2004 | Patton et al. | |
| 6,806,469 B2 | 10/2004 | Kerr | |
| 6,849,849 B1 | 2/2005 | Warner et al. | |
| 6,956,603 B2 | 10/2005 | Fujii | |
| 6,967,445 B1 | 11/2005 | Jewell et al. | |
| 7,030,378 B2 | 4/2006 | Allen et al. | |
| 7,034,543 B2 | 4/2006 | Iwasawa | |
| 7,049,822 B2 | 5/2006 | Kung | |
| 7,064,554 B2 | 6/2006 | Moore | |
| 7,093,974 B2 | 8/2006 | Kienitz | |
| 7,102,130 B2 | 9/2006 | Kerr | |
| 7,105,796 B2 | 9/2006 | Lewis et al. | |
| 7,105,818 B2 | 9/2006 | Anderson et al. | |
| 7,145,342 B2 | 12/2006 | Wendt et al. | |
| 7,157,705 B2 | 1/2007 | Hamrelius et al. | |
| 7,182,529 B2 | 2/2007 | Kurosawa | |
| 7,183,549 B2 | 2/2007 | Teich et al. | |
| 7,208,733 B2 | 4/2007 | Mian et al. | |
| 7,231,307 B2 | 6/2007 | Takei et al. | |
| 7,250,603 B1 | 7/2007 | Nugent | |
| 7,250,769 B1 | 7/2007 | Olson | |
| 7,304,297 B1 | 12/2007 | King et al. | |
| 7,312,822 B2 | 12/2007 | Lannestedt et al. | |
| 7,321,119 B2 | 1/2008 | King | |
| 7,336,823 B2 | 2/2008 | Guldevall | |
| 7,365,771 B2 | 4/2008 | Kahn et al. | |
| 7,369,174 B2 | 5/2008 | Olita et al. | |
| 7,381,952 B2 | 6/2008 | Teich et al. | |
| 7,411,193 B2 | 8/2008 | Warner et al. | |
| 7,422,365 B2 | 9/2008 | Chamberlain | |
| 7,423,272 B2 | 9/2008 | Hasegawa et al. | |
| 7,445,377 B2 | 11/2008 | Lee et al. | |
| 7,457,441 B2 | 11/2008 | Hartlove | |
| 7,483,208 B2 | 1/2009 | Zadravec | |
| 7,508,605 B2 | 3/2009 | Nishikawa et al. | |
| 7,519,210 B2 | 4/2009 | Hirsch et al. | |
| 7,528,372 B2 | 5/2009 | Garvey, III et al. | |
| 7,535,002 B2 | 5/2009 | Johnson et al. | |
| 7,538,326 B2 | 5/2009 | Johnson et al. | |
| 7,541,581 B2 | 6/2009 | Reed et al. | |
| 7,596,281 B2 | 9/2009 | Irani et al. | |
| 7,611,277 B2 | 11/2009 | Hebrank et al. | |
| 7,642,515 B2 | 1/2010 | Tinnes | |
| 7,649,174 B2 | 1/2010 | Mammen et al. | |
| 7,652,251 B1 | 1/2010 | King | |
| 7,655,908 B2 | 2/2010 | Kerr | |
| 7,693,679 B1 | 4/2010 | Warnke et al. | |
| 7,767,963 B1* | 8/2010 | Fujii | G03B 17/02 250/330 |
| 7,867,019 B1 | 1/2011 | Loukusa et al. | |
| 7,880,777 B2 | 2/2011 | Anderson | |
| 7,938,004 B1* | 5/2011 | Brunsch, Jr. | G01C 21/16 701/10 |
| 7,959,353 B2 | 6/2011 | Anantharaman | |
| 7,959,458 B2 | 6/2011 | Loukusa et al. | |
| 8,235,590 B2 | 8/2012 | Sheard et al. | |
| 2002/0074499 A1 | 6/2002 | Butler | |
| 2002/0109508 A1 | 8/2002 | Huang | |
| 2002/0162963 A1 | 11/2002 | Lannestedt et al. | |
| 2003/0025492 A1 | 2/2003 | Prineppi | |
| 2003/0057371 A1 | 3/2003 | Wood | |
| 2003/0146383 A1 | 8/2003 | Knauth | |
| 2004/0239778 A1 | 12/2004 | Soga | |
| 2005/0077469 A1 | 4/2005 | Kaushal | |
| 2005/0104995 A1* | 5/2005 | Spryshak | G02B 7/026 348/360 |
| 2005/0168573 A1 | 8/2005 | Dennis et al. | |
| 2006/0086815 A1 | 4/2006 | Kang | |
| 2006/0175549 A1 | 8/2006 | Miller et al. | |
| 2006/0249679 A1 | 11/2006 | Johnson et al. | |
| 2006/0261271 A1 | 11/2006 | Lee | |
| 2007/0074035 A1 | 3/2007 | Scanlon et al. | |
| 2007/0096024 A1 | 5/2007 | Furuya et al. | |
| 2007/0217036 A1* | 9/2007 | Miyauchi | G02B 7/102 359/811 |
| 2007/0247517 A1 | 10/2007 | Zhang et al. | |
| 2007/0288993 A1 | 12/2007 | Sakai et al. | |
| 2008/0061791 A1 | 3/2008 | Joos et al. | |
| 2008/0231803 A1 | 9/2008 | Feldon et al. | |

(56) References Cited

U.S. PATENT DOCUMENTS

| | | | |
|---|---|---|---|
| 2008/0265162 | A1 | 10/2008 | Hamrelius et al. |
| 2008/0278833 | A1* | 11/2008 | Yuan .................. G02B 7/028 359/820 |
| 2008/0315885 | A1 | 12/2008 | Andresen et al. |
| 2009/0001269 | A1 | 1/2009 | Tadano |
| 2009/0050806 | A1 | 2/2009 | Schmidt et al. |
| 2009/0090864 | A1 | 4/2009 | Glatzmaier et al. |
| 2009/0102925 | A1 | 4/2009 | Sheard et al. |
| 2009/0121135 | A1 | 5/2009 | Warner et al. |
| 2009/0136093 | A1 | 5/2009 | Hartlove |
| 2009/0206077 | A1 | 8/2009 | Melmon et al. |
| 2009/0229842 | A1* | 9/2009 | Gray ................. H01M 2/1055 173/20 |
| 2009/0294666 | A1 | 12/2009 | Hargel |
| 2009/0302219 | A1 | 12/2009 | Johnson et al. |
| 2009/0324213 | A1* | 12/2009 | Wang .................. G03B 17/02 396/529 |
| 2010/0001187 | A1 | 1/2010 | Fenske et al. |
| 2010/0046577 | A1* | 2/2010 | Sheard .................. G01J 5/026 374/130 |
| 2010/0073493 | A1 | 3/2010 | Godfrey et al. |
| 2010/0127171 | A1 | 5/2010 | Johsson et al. |
| 2010/0148066 | A1 | 6/2010 | Stratmann et al. |
| 2010/0157450 | A1* | 6/2010 | Im .......................... G02B 7/08 359/823 |
| 2010/0162206 | A1 | 6/2010 | Roth et al. |
| 2010/0201958 | A1 | 8/2010 | Hauf |
| 2010/0265431 | A1* | 10/2010 | Li .................... G02F 1/133308 349/59 |
| 2010/0309315 | A1 | 12/2010 | Hogasten et al. |
| 2011/0014812 | A1 | 1/2011 | Loukusa et al. |
| 2011/0169961 | A1 | 7/2011 | Wu |
| 2012/0249799 | A1 | 10/2012 | Shibata |
| 2013/0188058 | A1 | 7/2013 | Nguyen et al. |

FOREIGN PATENT DOCUMENTS

| | | |
|---|---|---|
| EP | 2278288 | 1/2011 |
| JP | 58-050439 | 3/1983 |
| JP | 02-064800 | 3/1990 |
| JP | 09-178566 | 7/1997 |
| JP | 2001005437 | 1/2001 |
| KR | 2011-0044666 | 4/2011 |
| WO | WO 2000004493 | 1/2000 |
| WO | WO 2006060746 | 6/2006 |
| WO | WO 2012027739 | 3/2012 |
| WO | WO 2012125819 | 9/2012 |

OTHER PUBLICATIONS

"Resilient". 2017. In Dictionary.com. Retrieved Jan. 5, 2016, from http://www.dictionary.com/browse/resilient?s=t.*
Agema Infrared Systems, Thermovision 782 Series Digital Image Processing System (DIPS), product specification brochure, 6 pages, Pub. No. 556, Sweden (1985).
Agema Infrared Systems, Thermovision 570 Series, operator's manual, 72 pages, Pub. No. 557 265, Ed. A, Sweden (Apr. 1997).
Agema Infrared Systems, Thermovision 550 Series, operator's manual, 74 pages, Pub. No. 557 084, Ed. B, Sweden (Sep. 1997).
Agema Infrared Systems, Thermovision 210 Series The First Team, operator's manual, 90 pages, Publication No. 1 557 627 Rev. A, Sweden (Oct. 23, 2002).
Agema Infrared Systems, Thermovision 400 Series, operator's manual, 56 pages, New Pub. No. 1 557 628, Rev. A, Sweden (Oct. 23, 2002).
Flir Systems—Thermacam, Model 99 Database, operator's manual, 38 pages, Sweden (1999).
Flir Systems—Thermacam, Model PM390 Hand-held IR Imaging Radiometers, operating instruction, pp. 1-125, Document No. 14882-000 Rev. B (1999).
Flir Systems—Thermacam, Model PM595 High Performance Handheld Infrared Camera, The complete Predictive Maintenance Solution, brochure, 8 pages, North Billerica, USA (1999).
Flir Systems—Thermacam, Model P65, user's manual, 246 pages, Publication No. 1557954 Rev. a55, USA (2006).
Flir Systems—Thermacam, Model 2000 Reporter, operator's manual, pp. 1-249, Pub. No. 1 557 436 Version A, Sweden (1996-2000).
Inframetrics Inc., Model 522L Medical Infrared Imaging Radiometer, operator's manual, 62 pages, Document No. 06909-000 Rev. A, Waltham, USA (1990).
Inframetrics Inc., Model 760 Infrared Imaging Radiometer, operator's manual, 122 pages, Document No. 07137-000 Rev. C , Waltham, USA (1992).
Inframetrics Inc., Model 525-Imaging Radiometers for Applied Thermography, brochure, 40 pages, Bedford, USA, Aug. 1982, as evidenced by the attached Office of Scientific & Technical Information Report (see p. 7, 32, and 40).
Inframetrics Inc., Model 600 Equipment Setup, operations manual, 89 pages, Publication No. T559095 Rev. A, available at least as early as 1988, as evidenced by the attached Software Abstract from the Energy Science and Technology Software Center (see p. 89).
Inframetrics Inc., Model 700 Infrared Imaging Radiometer Features and Specifications, manual, 26 pages, Publication No. T559095 Rev. A, available at least as early as Dec. 1990, as evidenced by the attached Decision memo from the Comptroller General of the United States (see p. 22-24).
Inframetrics Inc., Model 535 Infrared Medical Thermography System, brochure, 15 pages, Billerica, USA, available at least as early as Aug. 18, 1998, as evidenced by the attached FDA 510(k) Summary (see pp. 1113).
Inframetrics Inc., Model 520A Infrared Imaging Radiometer, operator's manual, 147 pages, Publication No. T559094 Rev. A, USA, available at least as early as 1983, as evidenced by the attached report on Big Strides in Refractory Management (see p. 142).
Inframetrics—Thermacam, Model PM380 Infrared Imaging Radiometers, introduction and overview manual, 30 pages, USA (1996).
Inframetrics Inc.—Thermacam, Model PM380 Infrared Predictive Maintenance in the Palm of your Hand, brochure, 4 pages, North Billerica, USA (1997).
Inframetrics—Thermacam, Model X90 Infrared FPA Predictive Maintenance System, brochure, 2 pages, USA (1998).
Inframetrics—Thermacam Ultra, Model PM395 Hand-held Infrared Imaging Radiometers, operating instructions, 121 pages, Publication No. T559098 Rev. A, North Billerica, USA, available at least as early as Oct. 19, 1998, as evidenced by the attached "Hot Products" Article on Design News (see p. 120).
International Search Report and Written Opinion for Application No. PCT/US2012/029217 dated Oct. 12, 2012 (10 pages).
Siemers, E., "Fluke Sued by Rival Flir" <http://www.bizjournal.com/seattle/stories/2010/08/16/daily45.html> Oregon Business Journal, webpage available since Aug. 20, 2010.
Atlas Copco Elektrowerkzeuge GmbH, Professional Quality Tools Catalogue 96/97 (Feb. 1996) 5 pages.
Atlas Copco, Professional Battery System PBS 3000 (1995) 3 pages.
International Search Report and Written Opinion for Application No. PCT/US2011/049541 dated Apr. 18, 2012 (8 pages).
Chinese Patent Office Action for Application No. 201180052026.5 dated Oct. 9, 2015 with translation (16 pages).
United States Patent Office Action For U.S. Appl. No. 13/803,875 dated Oct. 6, 2015 (19 pgs).
United States Patent Office Action For U.S. Appl. No. 13/819,496 dated Nov. 25, 2015 (29 pgs).
Chinese Patent Office Action for Application No. 201180052026.5 dated Jul. 1, 2016 (4 pages).
United States Patent Office Action For U.S. Appl. No. 13/803,875 dated Jun. 22, 2017 (60 pages).

* cited by examiner

THERMAL IMAGER

CROSS REFERENCE TO RELATED APPLICATIONS

This application claims priority to U.S. Provisional Patent Application No. 61/452,778, filed Mar. 15, 2011, the contents of which are herein incorporated by reference.

BACKGROUND

The present invention relates to portable electronic imaging devices, such as a thermal imager.

A thermal imager is a thermal detection device which detects and displays a temperature characteristic of a scene. Thermal imagers are used by professionals in a variety of industries to assess temperatures of objects within a field-of-view ("FOV") of the thermal imager. Such devices may be used in a variety of environments, and may be subject to rough handling or even being dropped upon a hard surface.

SUMMARY

In one embodiment, the invention provides a handheld thermal imager. The thermal imager includes a housing defining a cavity. A lens barrel has a first end portion and a second end portion. The lens barrel is at least partially disposed within the cavity. A lens is coupled to the lens barrel first end portion. A resilient buffer member supports the lens barrel within the cavity. A thermal sensor is coupled to the lens barrel second end portion. A processing module receives signals from the thermal sensor. A display is coupled to the processing module for displaying a temperature characteristic of a scene.

In another embodiment the invention provides an imaging device. The imaging device includes a housing assembly having a first housing member and a second housing member. The first housing member and the second housing member define a cavity. A lens barrel has a first end and a second end. The lens barrel is at least partially disposed in the cavity. A resilient buffer includes a ring-shaped body and at least one radial extension member. The ring-shaped body is annularly disposed about the lens barrel between the first end and the second end. The radial extension member is coupled to the housing assembly to support the lens barrel within the cavity. A lens is coupled to the lens barrel first end. A thermal sensor is resiliently coupled to the lens barrel second end and substantially supported by the first housing member and not the second housing member.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
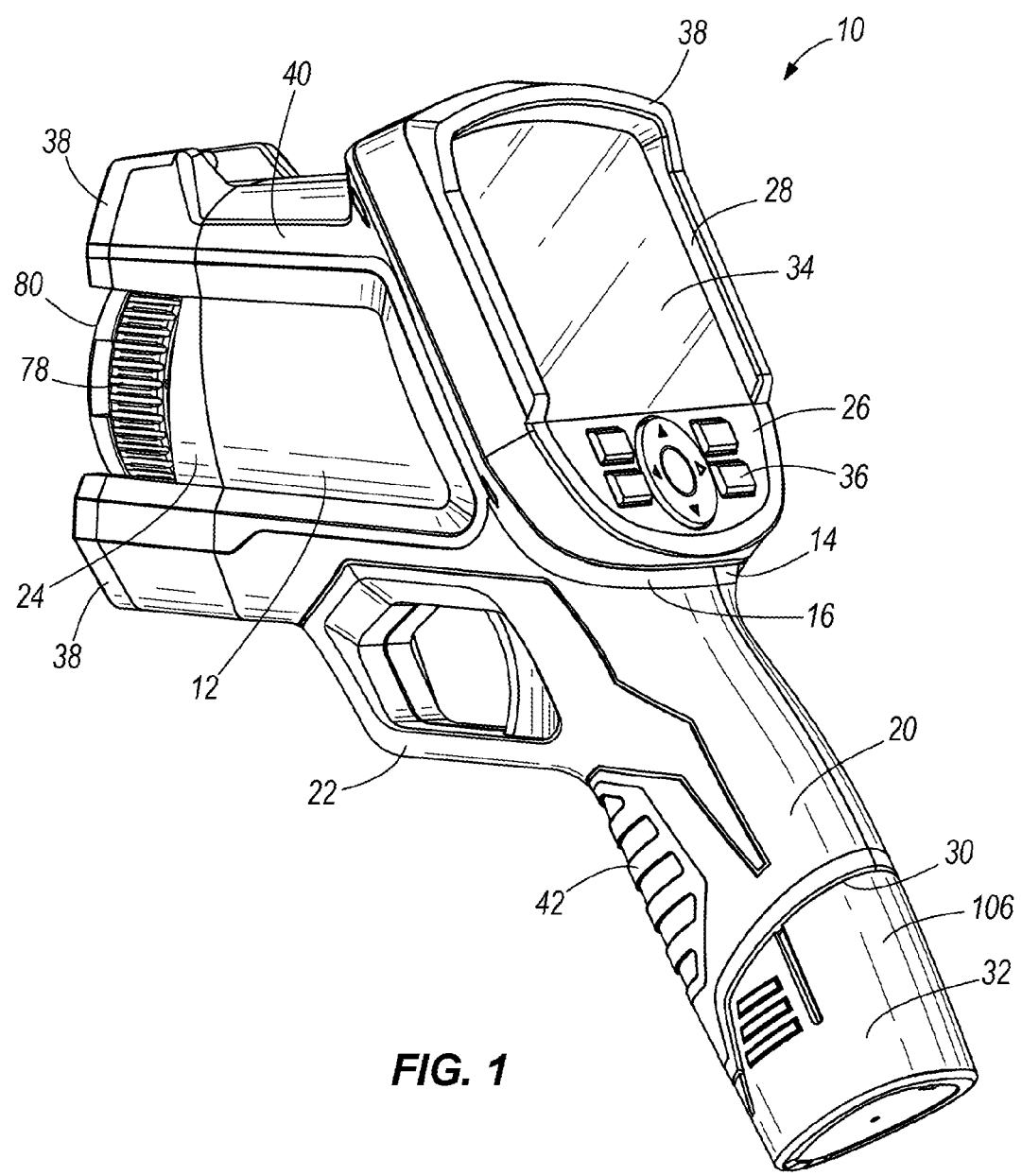
FIG. 1 is a perspective view of a thermal imager according to one aspect of the invention.
Figure 2:
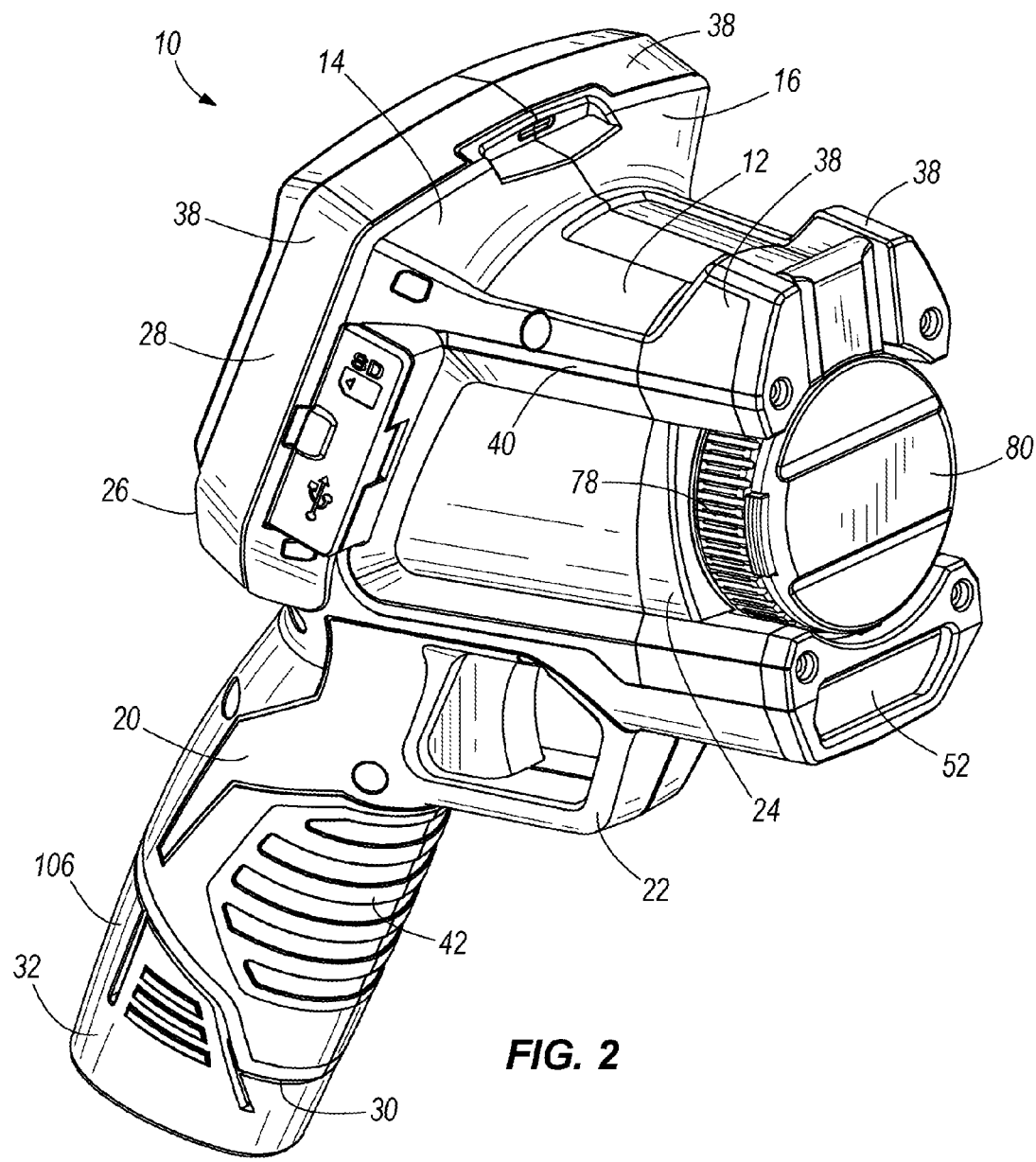
FIG. 2 is an alternative perspective view of the thermal imager of FIG. 1.

FIGS. 1 and 2 illustrate a thermal imager 10. The thermal imager 10 includes a housing 12. The housing 12 includes a right housing half 14 and a left housing half 16, with a cavity 18 (FIGS. 5 and 6) defined by the housing halves 14 and 16.

Referring to FIGS. 1 and 2, the housing 12 includes a handle portion 20, a trigger portion 22, a lens portion 24, a user input portion 26, and a display portion 28. The handle portion 20 defines a battery pack receptacle 30 for receiving a battery pack 32. The display portion 28 includes a visual display 34 and the user input portion includes one or more user input devices 36 (e.g., buttons), respectively.

Bumpers 38 are coupled to the housing 12. The bumpers 38 are formed of a resilient material, such as co-molded or overmolded rubber or synthetic rubber. The purpose of the bumpers 38 is to increase the impact time should the thermal imager 10 be dropped or bumped into a hard surface. In the illustrated embodiment, the bumpers 38 surround the lens portion 24, the display portion 28, and edges 40 of the housing 12. Additional resilient material forms gripping surfaces 42 on the handle portion 18. The bumpers 38 may be coupled to the housing 12 by a co-molding process, or they may be separately formed and attached to the housing 12 by mechanical, thermal, or adhesive means.

Figure 3:
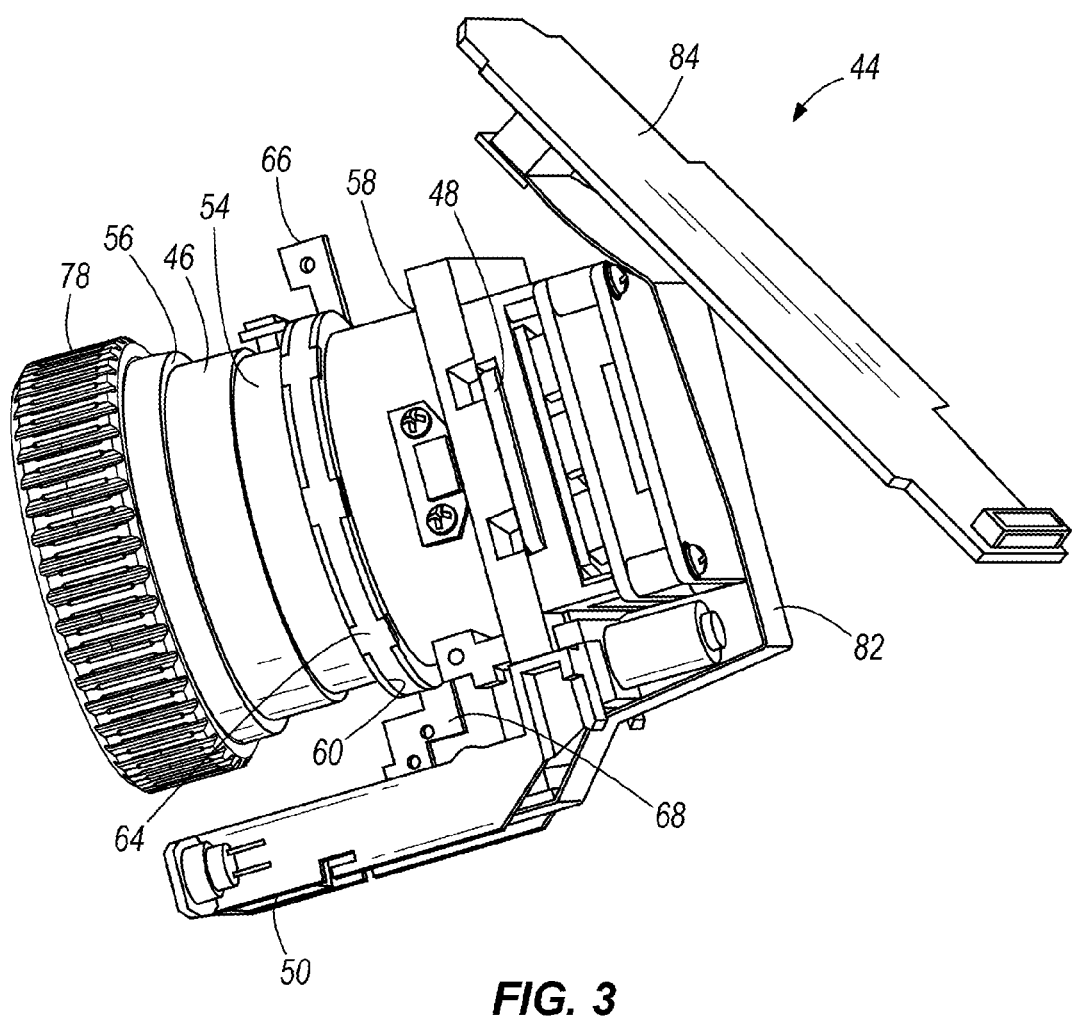
FIG. 3 is a perspective view of a detector assembly of the thermal imager of FIG. 1.

FIG. 3 illustrates a detector assembly 44 of the thermal imager 10. The detector assembly 44 includes, among other things, a lens barrel 46, a thermal sensor 48, and a visual camera 50 disposed beneath the lens barrel 46. The visual camera 50 is covered by a clear plastic shield 52 for protection (see FIG. 1). In some embodiments, an LED work light may be incorporated into the thermal detector assembly, adjacent the visual camera.

Figure 5:
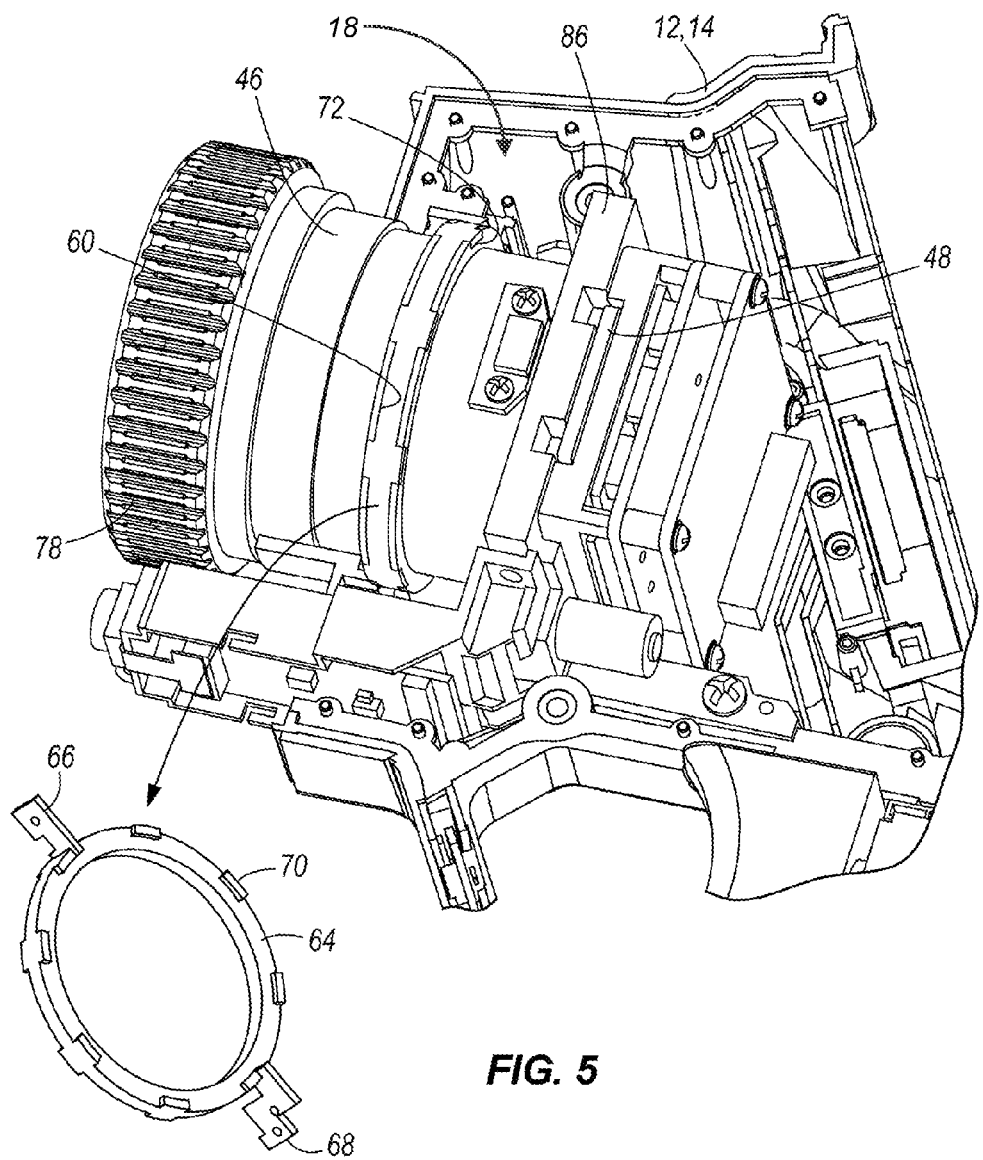
FIG. 5 is a cutaway perspective view of a portion of the thermal imager of FIG. 1, with an additional impact dampening feature shown in exploded view.

Referring to FIG. 3, the lens barrel 46 includes a cylindrical body 54 with a first end 56 and a second end 58. An annular groove 60 is defined in the cylindrical body 54 of the lens barrel 46, between the first and second ends 56 and 58. Referring now to FIG. 5, a resilient buffer ring 64 is disposed within the annular groove 60 of the lens barrel 46. The resilient buffer ring 64 includes an upper radial extension member 66 and a lower radial extension member 68. The extension members 66 and 68 are the only portion of the resilient buffer ring 64 that is coupled to the surrounding housing 12. The resilient extension members 66 and 68 thereby support the lens barrel 46 within the housing 12, while substantially reducing impact forces transferred from the housing 12 to the lens barrel 46.

As shown in the exploded view of FIG. 5, the resilient buffer ring 64 includes a plurality of circumferentially arranged teeth 70. When installed within the annular groove 60, the teeth 70 fit inside corresponding recesses 72 formed in the annular groove 60. The tooth and recess arrangement 70 and 72 is provided to minimize rotation of the lens barrel 46 relative to the housing 12.

Figure 4:
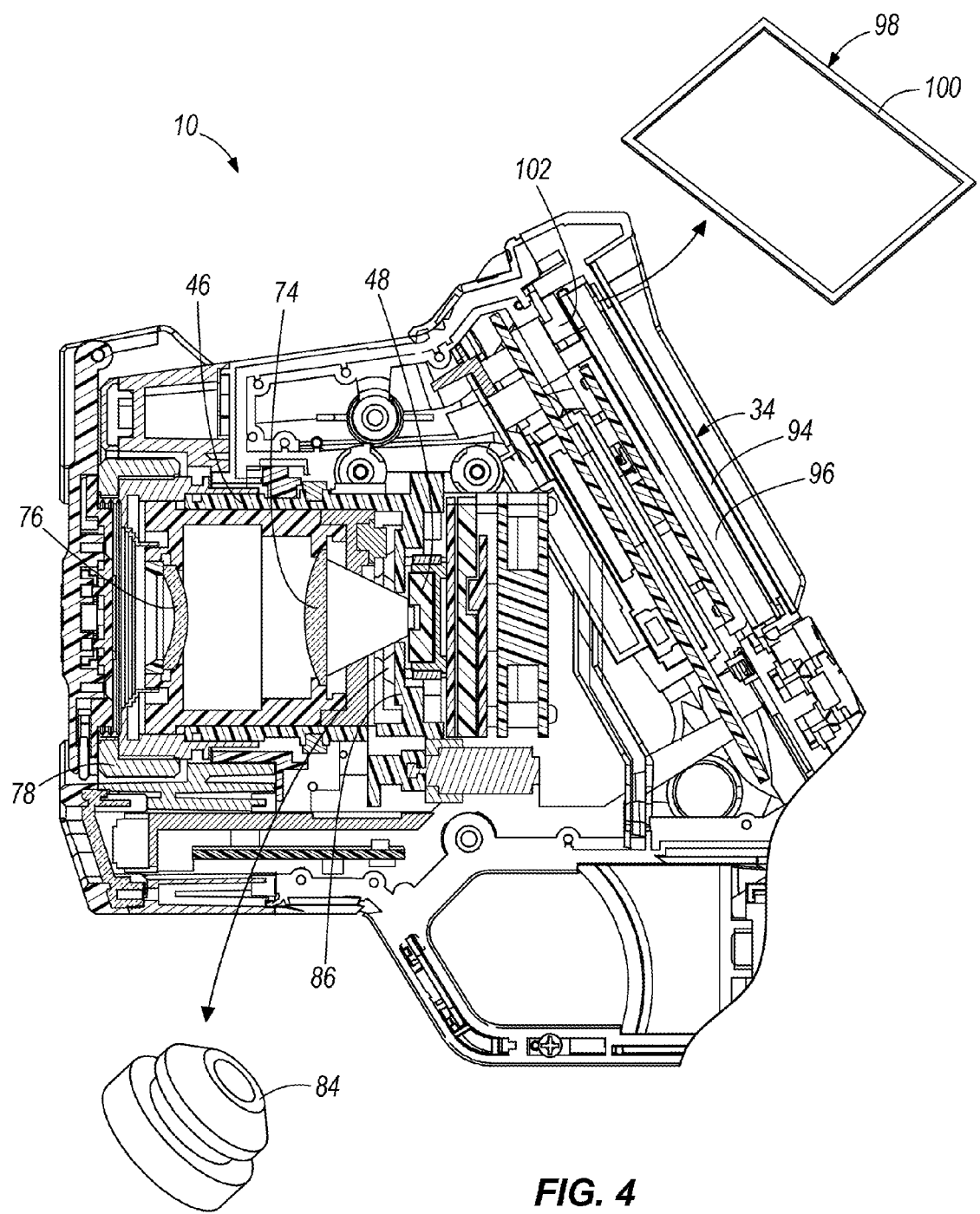
FIG. 4 is a cross sectional view of a portion of the thermal imager of FIG. 1, with impact dampening features shown in exploded view.

With reference to FIG. 4, a cross-sectional view of the thermal imager 10, the optics for the detector assembly 44 include a fixed inner lens 74 and an adjustable aspheric lens 76. The lenses 74 and 76 are made of, for example, glass, quartz glass, fluorite, plastic, acrylic, Germanium, or the like. The inner lens 74 is housed within the lens barrel 46. The aspheric lens 76 is manually adjustable for focus via a focus ring 78 accessible from the exterior of the thermal imager 10 (see FIGS. 1 and 2). The focus ring 78 is rotatably coupled to the lens barrel 46. The focus ring 78 may be formed of a resilient material, such as rubber or synthetic rubber, to substantially reduce the transfer of impact forces to the lens barrel 46. Referring to FIG. 2, a lens cover 80 is selectively coupled to the focus ring 78. The lens cover 80 includes a resilient portion or is formed entirely of a resilient material in order to substantially reduce the transfer of impact forces to the detector assembly 44.

Referring to FIG. 3, the thermal sensor 48 of the detector assembly 44 is, for example, a 160 pixel by 120 pixel (i.e., 160×120) un-cooled microbolometer. The microbolometer generates signals corresponding to a thermal image that is 160 pixels wide and 120 pixels long. Each pixel of the microbolometer provides temperature measurements having an accuracy within approximately 2%. The thermal sensor 48 is highly sensitive to heat and temperature changes. In order to properly compensate for this sensitivity, additional sensors may be used to measure temperature fluctuations caused by both internal and external heat sources.

A flexible circuit cable 82 electrically connects the thermal sensor 48 and visual camera 50 to a processing module that includes a printed circuit board assembly (PCBA) 84. The flexible circuit cable 82 provides the detector assembly 44 with improved impact resistance by minimizing the transfer of mechanical shock to connector contacts and soldered joints within the detector assembly 44.

Figure 7:
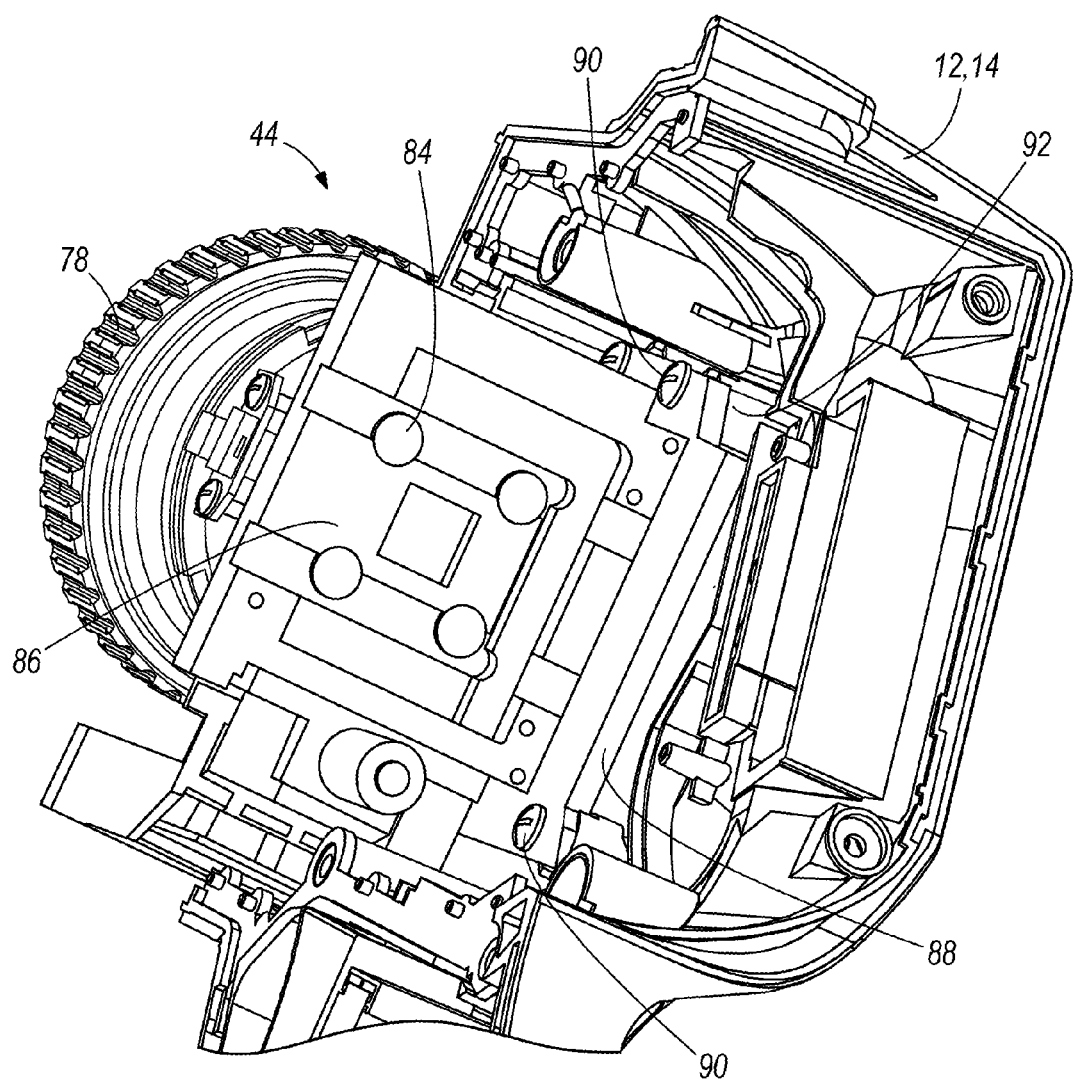
FIG. 7 is an alternative cutaway perspective view of a portion of the thermal imager of FIG. 1.

As also shown in FIG. 4, a plurality of rubber grommets 84 are installed between the lens barrel 46 and the thermal sensor 48. One configuration of these grommets 84 is shown in exploded view. As best illustrated in FIG. 7, four grommets 84 are arranged symmetrically about an end plate 86 that is coupled to the lens barrel 46, though in other embodiments, more or fewer grommets may be used. The grommets 84 are configured to substantially reduce the transfer of impact forces from the lens barrel 46 to the thermal sensor 48.

Figure 6:
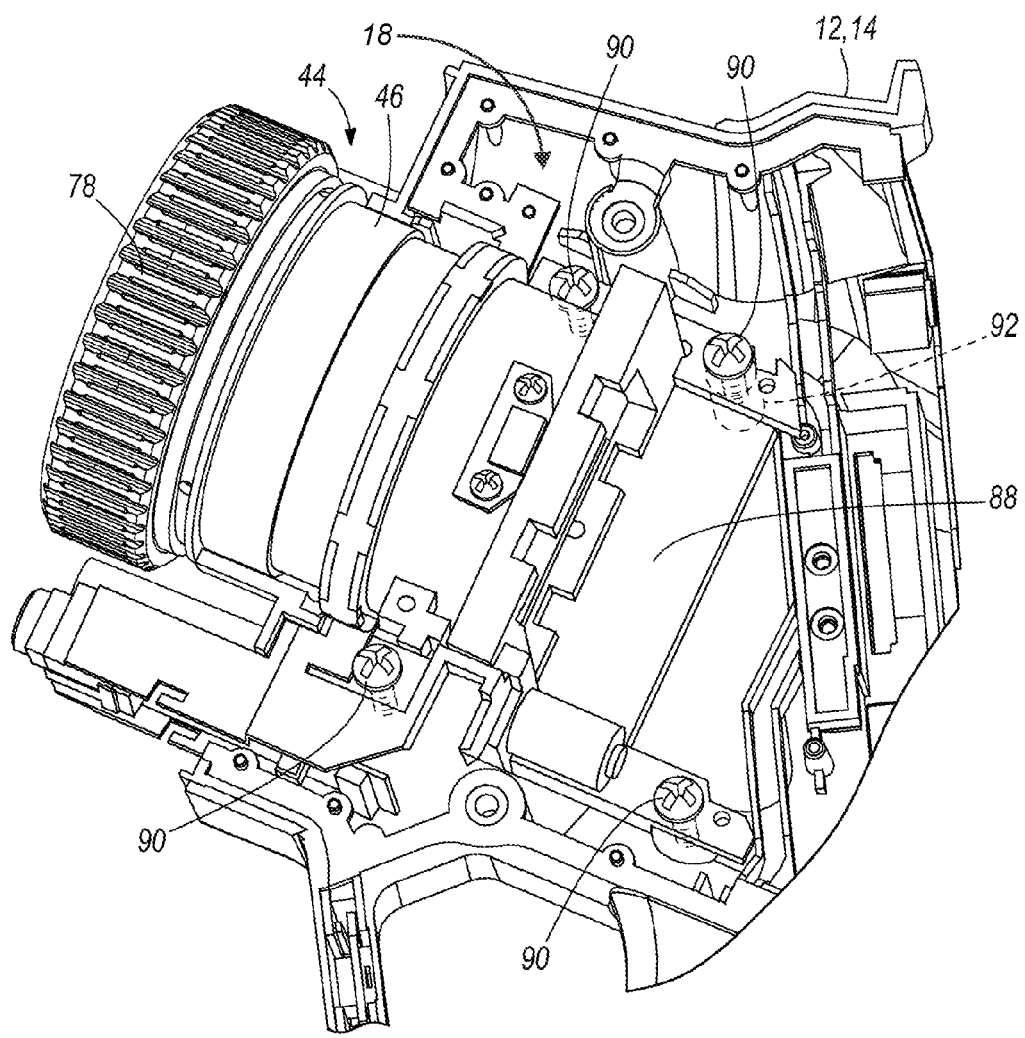
FIG. 6 is a cutaway perspective view of a portion of the thermal imager of FIG. 1.

With reference to FIGS. 6 and 7, the detector assembly 44 is coupled to a substantially rigid mounting plate 88. The mounting plate 88, in turn, is coupled to the housing 12. More specifically, the mounting plate 88 is coupled to the right housing half 14 of the housing 12, via a plurality of threaded fasteners 90 that engage apertures 92 formed in the right half 14 of the housing 12. The threaded fasteners 90 may be, for example, cap or button head screws. Resilient washers may be disposed between the threaded fasteners and the mounting plate to provide a degree of impact resistance.

With reference to FIG. 4, the visual display 34 includes an external display lens 94 covering an underlying electronic display 96. The electronic display 96 may be, for example a liquid crystal display ("LCD"), a light-emitting diode ("LED") display, an organic LED ("OLED") display, an electroluminescent display ("ELD"), a surface-conduction electron-emitter display ("SED"), a field emission display ("FED"), or the like. In some embodiments, the electronic display 96 is a 3.5" thin-film transistor ("TFT") LCD. In other embodiments, the electronic display 96 is a super active-matrix OLED ("AMOLED") display.

A resilient gasket 98 is disposed between the external display lens 94 and the electronic display 96. The resilient gasket 98 substantially reduces the transfer of impact forces from the external display lens 46 to the underlying LCD panel 48. As shown in exploded view, the resilient gasket 98 has a rectangular profile 100, matching the profile of the electronic display 96 and display lens 94. The resilient gasket 98 may be formed from a microcellular polyurethane, such as PORON®, or another resilient material. A flexible frame member 102 supports the electronic display 96 internally.

Figure 8:
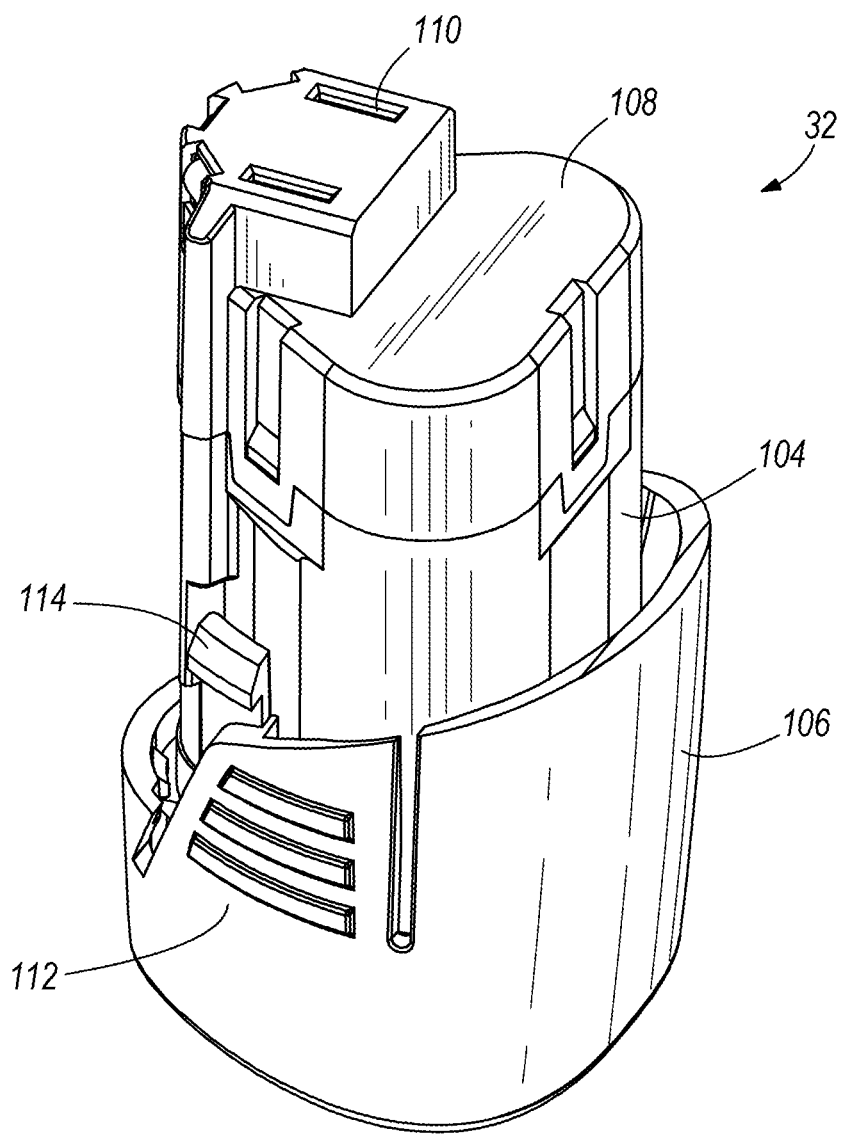
FIG. 8 is a perspective view of a battery pack of the thermal imager of FIG. 1.

With reference to FIG. 8, the battery pack 32 includes a casing 104, an outer housing 106 coupled to the casing 104, and a plurality of battery cells (not visible) positioned within the casing 104. The casing 104 is shaped and sized to engage the receptacle 30 in the thermal imager 10. The casing 104 includes an end cap 108 to substantially enclose the battery cells within the casing 104. The illustrated end cap 108 includes two power terminals 110 configured to mate with corresponding power terminals of the thermal imager 10. In other embodiments, the end cap 108 may include terminals that extend from the battery pack 32 and are configured to be received in receptacles supported by the thermal imager 10. The terminals couple to a battery circuit (not shown).

The casing 104 and power terminals 110 substantially enclose and cover the terminals of the thermal imager 10 when the battery pack 32 is positioned in the receptacle 30 (FIGS. 1 and 2). That is, the battery pack 32 functions as a cover for the receptacle 30 and terminals of the thermal imager 10. Once the battery pack 32 is disconnected from the thermal imager 10 and the casing 104 is removed from the receptacle 30, the battery terminals on the thermal imager 10 are generally exposed to the surrounding environment.

Referring to FIG. 8, the outer housing 106 is coupled to the casing 104 substantially opposite the end cap 108 and surrounds a portion of the casing 104. In the illustrated construction, when the casing 104 is inserted into or positioned within the corresponding receptacle 30 in the thermal imager 10, the outer housing 106 generally aligns with outer surfaces of the handle portion 18 (FIGS. 1-2). In this construction, the outer housing 106 is designed to substantially follow the contours and general shape of the handle portion 18. In such embodiments, the outer housing 106 effectively increases (e.g., extends) the length of the handle portion 18 of the thermal detection device 10.

Referring to FIG. 8, two actuators 112 (only one of which is shown) and two tabs 114 are formed in the outer housing 106 of the battery pack 32. The actuators 112 and the tabs 114 define a coupling mechanism 116 for releasably securing the battery pack 32 to the thermal imager 10. Each tab 114 engages a corresponding recess formed in the receptacle 30 of the thermal imager 10 to secure the battery pack 32 in place. The tabs 114 are normally biased away from the casing 104 (i.e., away from each other) due to the resiliency of the material forming the outer housing 106. Actuating (e.g., depressing) the actuators 112 moves the tabs 114 toward the casing 104 (i.e., toward each other) and out of engagement with the recesses such that the battery pack 32 may be pulled out of the receptacle 30 and away from the thermal imager 10.

The battery pack 32 is also configured to connect and provide power to additional devices such as drills, saws, grease guns, right angle drills, pipe cutters, lasers, impact wrenches, impact drivers, reciprocating saws, inspection cameras, radios, worklights, screwdrivers, wall scanners, infrared thermometers, clamp meters, digital multimeters, fork meters, multi-tools, grinders, band saws, jig saws, circular saws, rotary hammers, generators, vacuums, and the like.

Thus, the invention provides, among other things, a thermal imager with improved impact resistance characteristics. Various features and advantages of the invention are set forth in the following claims.

What is claimed is:

1. A handheld thermal imager, comprising:
   a housing defining a cavity;
   a lens barrel having a first end portion and a second end portion, the lens barrel at least partially disposed within the cavity;
   a lens coupled to the lens barrel first end portion;
   a resilient buffer member supporting the lens barrel within the cavity, the resilient buffer member including a ring-shaped body, a first radial extension member connected to and extending perpendicularly from the ring-shaped body, and a second radial extension member connected to and extending perpendicularly from the ring-shaped body, the lens barrel supported within the housing by the first radial extension member and the second radial extension member;
   a thermal sensor coupled to the lens barrel second end portion;
   a processing module receiving signals from the thermal sensor; and
   a display coupled to the processing module for displaying a temperature characteristic of a scene,
   wherein the first radial extension member and the second radial extension member are connected to the housing, and
   wherein the first radial extension member and the second radial extension member reduce impact forces transferred from the housing to the lens barrel.

2. The handheld thermal imager of claim 1, further comprising at least one resilient bumper member coupled to the outer housing.

3. The handheld thermal imager of claim 1, wherein at least one of the outer housing and the lens barrel defines an annular groove for receiving a portion of the resilient buffer member.

4. The handheld thermal imager of claim 3, wherein the annular body defines tooth portions, and further wherein the annular groove defines recesses for receiving the tooth portions.

5. The handheld thermal imager of claim 1, wherein the lens barrel second end is resiliently coupled to the thermal sensor.

6. The handheld thermal imager of claim 5, further comprising at least one resilient connecting member disposed between the lens barrel second end and the thermal sensor.

7. The handheld thermal imager of claim 6, wherein the resilient connecting member includes a plurality of resilient grommets.

8. The handheld thermal imager of claim 1, wherein the thermal sensor is coupled to the housing.

9. The handheld thermal imager of claim 1, wherein the thermal sensor is coupled to the processing module via a flexible cable.

10. The handheld thermal imager of claim 1, wherein the display includes a display panel and a display lens, the display lens separated from the display panel by a resilient gasket member.

11. The handheld thermal imager of claim 1, further comprising a visual camera assembly.

12. The handheld thermal imager of claim 1, wherein the housing includes a handle portion, the handle portion defining a battery receptacle.

13. The handheld thermal imager of claim 12, further comprising a power tool battery pack at least partially received by the battery receptacle.

14. The handheld thermal imager of claim 1, further comprising a resilient focus ring coupled to the lens.

15. The handheld thermal imager of claim 14, further comprising a lens cover selectively coupled to the focus ring, the lens cover including a resilient portion.

16. The handheld thermal imager of claim 1, wherein the housing includes a first housing member and a second housing member, the first housing member and the second housing member joined to define the cavity, the thermal sensor being coupled to the first housing member and not the second housing member.

17. An imaging device, comprising:
   a housing assembly including a first housing member and a second housing member, the first housing member and second housing member defining a cavity;
   a lens barrel having a first end and a second end, the lens barrel at least partially disposed in the cavity;
   a resilient buffer including a ring-shaped body, a first radial extension member connected to and extending perpendicularly from the ring-shaped body, and a second radial extension member connected to and extending perpendicularly from the ring-shaped body, the ring-shaped body annularly disposed about the lens barrel between the first end and the second end, the first radial extension member and the second radial extension member coupled to the housing assembly to support the lens barrel within the cavity;
   a lens coupled to the lens barrel first end; and
   a thermal sensor resiliently coupled to the lens barrel second end and supported by the first housing member and not the second housing member,
   wherein the first radial extension member and the second radial extension member reduce impact forces transferred from the housing to the lens barrel.

* * * * *